March 13, 1945. E. SEMBLER ET AL 2,371,549
RAKE ATTACHMENT FOR VEHICLES
Filed April 26, 1944

INVENTORS
EDWARD SEMBLER
JOSEPH E. GERARD
BY Clark P Ott
ATTORNEYS

Patented Mar. 13, 1945

2,371,549

UNITED STATES PATENT OFFICE 2,371,549

RAKE ATTACHMENT FOR VEHICLES

Edward Sembler and Joseph E. Gerard, Patchogue, N. Y.

Application April 26, 1944, Serial No. 532,790

5 Claims. (Cl. 37—2)

This invention relates to auxiliary tools adapted for attachment to tractors, trucks or equivalent power driven vehicles and is directed more particularly to an improved pusher type rake adapted to be attached to the forward end of the vehicle for removing stumps, rocks, underbrush, roots or other obstructions for the clearing of land preparatory to the planting of crops.

One of the principal objections to devices of this type which are now available and in general use is that they either effect the turning of the subsoil over the top soil or the displacement or disturbance of the top soil to such an extent that it frequently requires two or more seasons of preparation of the land before it is suitable for the productive planting of crops.

The present invention broadly comprehends an improved rake attachment of the indicated character which is so constructed and arranged as to provide means for effectively and rapidly clearing land of stumps, underbrush, rocks, roots or other obstructions without materially displacing, turning under or otherwise disturbing the top soil, so that the land thus cleared may be immediately planted.

More particularly, the invention resides in the provision of an improved pusher type rake attachment for tractors, trucks or equivalent vehicles which is so constructed as to obtain maximum strength in proportion to its weight, one in which the teeth are effectively reinforced against wear and lateral displacement, while readily removable and replaceable and which teeth are so spaced and mounted as to dislodge and remove stumps, underbrush, roots, rocks and other obstructions with a minimum disturbance of the top soil, thus leaving the cleared land comparatively smooth and even and ready for immediate planting.

With the above enumerated and other objects in view, the invention is set forth in greater detail in the following specification, particularly pointed out in the appended claims and illustrated in the accompanying drawing, in which:

Figure 1:
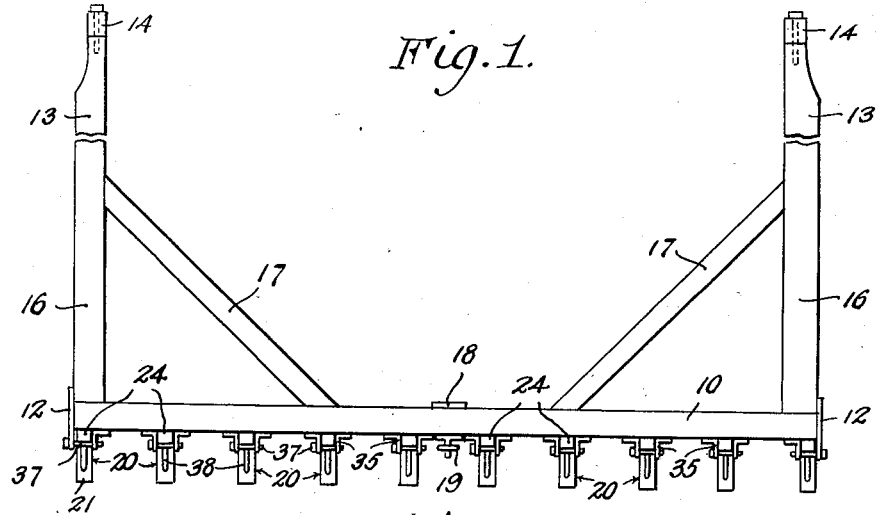
Fig. 1 is a top plan view of a rake attachment constructed in accordance with the present invention.
Figure 2:
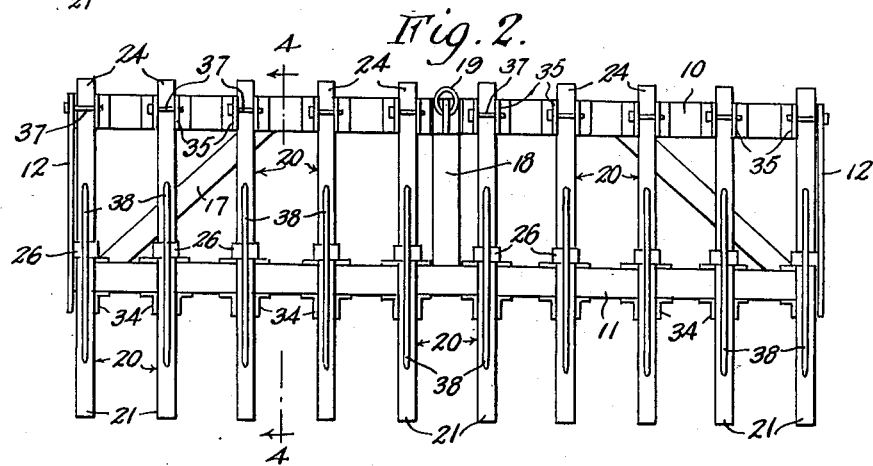
Fig. 2 is a front view of the same.
Figure 3:
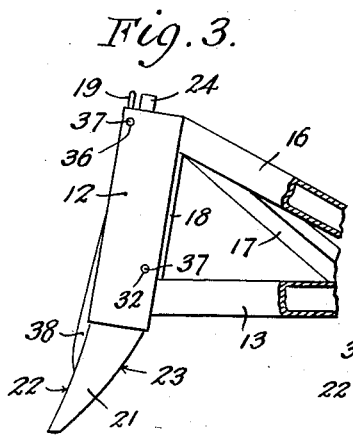
Fig. 3 is a fragmentary side view thereof.
Figure 4:
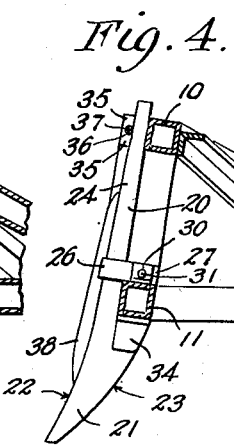
Fig. 4 is a longitudinal sectional view therethrough taken approximately on the line 4—4 of Fig. 2.
Figure 5:
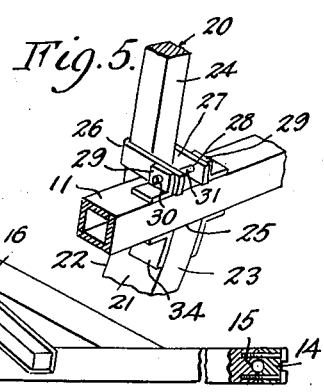
Fig. 5 is a fragmentary perspective view showing the connection between one of the rake teeth and the lower cross beam.

Referring to the drawing by characters of reference, the rake attachment includes a pair of parallel vertically spaced upper and lower horizontally arranged cross beams 10 and 11, each of which is preferably as shown of square cross sectional shape and of hollow construction to obtain the maximum strength in proportion to its weight. The cross beams 10 and 11 are rigidly secured at their opposite ends to side plates 12 which retain the beams in their vertically spaced parallel relation, while the lower cross beam 11 is rigidly secured at its opposite end portions respectively to a pair of rearwardly directed side arms 13 which have bolted or otherwise secured thereto bearing blocks 14. The rear end faces of said side arms and the confronting forward faces of the bearing blocks are formed with mating semi-cylindrical transverse grooves 15 defining a bearing opening adapted to receive trunnions (not shown) provided on a vehicle for mounting the rake attachment thereon for vertical swinging movement to raise and lower the same.

Inclined brace members 16 are rigidly secured at their forward ends to the opposite end portions of the upper cross beam 10 and extend downwardly and rearwardly at an angle therefrom and are secured at their lower rear ends to the side arms 13 intermediate the ends thereof. Diagonal struts 17 are connected at their rear lower ends to the side arms 13 and at their forward upper ends to the upper cross beam 10 adjacent to the central portion thereof. A vertically disposed central spacing and reinforcing plate 18 is secured respectively at its upper and lower ends to the rear faces of the cross beams 10 and 11, medially thereof and a ring 19 or equivalent attaching element is secured to the forward face of the upper cross beam 10 at the center thereof for anchoring to the rake attachment a suitable hoisting means carried by the vehicle so that the rake attachment may be raised and lowered.

The rake attachment further includes a plurality of identical rake teeth or tines designated generally by the reference character 20 and each of said teeth consists of a downwardly tapering foot portion 21 having forwardly curved downwardly converging leading and trailing edges 22 and 23 and a substantially straight upwardly projecting shank portion 24, the forward edge of which merges into the leading edge of the foot portion and the rear edge of which is recessed or offset forwardly of the trailing edge to define a shoulder 25 at the juncture of the foot and shank portions. Each tooth 20 has secured to the shank portion 24 thereof adjacent its juncture with the foot portion, an attaching element 26 which, as shown, is in the form of a U-shaped clip or clevis embracing the forward and opposite side edges of the shank portion, with the rear terminals 27 thereof protruding beyond the rear edge thereof and with the lower edges spaced from the shoulders a distance approximately equal to the height of the lower cross beam 11. The terminals 27 are provided with registering apertures 28 and are adapted to fit between the upstanding flanges 29 of a pair of spaced angle iron sections secured to the upper surface of the lower cross beam 11, and which flanges 29 are formed with registering apertures 30 adapted to be aligned with the apertures 28 so as to receive therethrough a locking pin 31 for detachably connecting the lower ends of the shanks of the rake teeth 20 to the lower cross beam 11. It will be understood that there is a pair of angle iron sections for each rake tooth except the two outermost teeth, in which instance a single angle iron section will be employed for each of said outermost teeth, with the upstanding apertured flange of each spaced inwardly from each side plate 12, said side plates being formed with apertures 32 registering with the aperture 30 to receive the locking pins 31.

In order to brace the rake teeth laterally and particularly the depending foot portion 21 of each tooth so as to relieve the same of some of the laterally exerted strains and stresses imparted thereto as a result of the wedging therebetween of tree trunks, branches, roots, rocks or other objects, angle iron sections 34 are secured to the under surface of the lower cross beam 11 with the flanges thereof depending therefrom and extending downwardly along opposite sides of said foot portions with the exception of the outer side of each of the outermost teeth, alongside of which the lower ends of the side plates 12 extend.

The shank portions 24 of the rake teeth 20, adjacent the upper ends thereof are detachably secured in juxtaposition to the upper cross beam 10 by engagement of the same between the side plates 12 and angle plates attached to the forward face of the upper cross beam with the flanges 35 thereof projecting forwardly therefrom. A single angle plate is secured adjacent each end of said upper cross beam with its flange 35 spaced from the side plate a distance equal to the width of the shank portion of a rake tooth and the remaining angle plates are arranged in equidistantly spaced pairs to respectively receive the shank portions of the intermediate rake teeth 20. The side plates 12 and the flanges 35 are formed with aligned apertures 36 which are located to receive therethrough retaining pins 37 so that said pins extend transversely across and in front of the shank portions 24.

As shown, the rake teeth are preferably reinforced against wear by bead strips 38 extending longitudinally of the forward faces of the shank and foot portions thereof, said bead strips being notched to fit over the bight portions of the clips 26 so that said clips underlie the bead strips. The bead strips 38 are preferably narrower than the teeth 20 and are arranged at the transverse center thereof with the opposite ends terminating short of the upper and lower ends of the teeth.

In practice, the cross beams and rake teeth are so proportioned and are so spaced with reference to each other that in using the attachment applied to the forward end of a tractor, truck or other vehicle for clearing land of stumps, underbrush, roots, rocks or other obstructions of this character, the top soil will freely pass between the teeth and cross beams without unduly disturbing the same or displacing thereof while avoiding the turning of the subsoil thereover. It has also been observed that a rake attachment of the type set forth leaves the cleared land fairly smooth and even so that the necessity of regrading is obviated thus permitting of an immediate planting of crops.

It is also apparent that the removal of and replacement of one or more of the rake teeth 20 may be readily and speedily accomplished by merely removing the two locking pins 31 and 37 which retain each tooth in place and reinserting said pins after the teeth have been replaced. In removing larger stumps, it has been found necessary to run the rake along each side of the stump to break off the roots after which the rake is run directly against the stump.

What is claimed is:

1. In a pusher type rake attachment for vehicles, a rake frame including vertically spaced upper and lower cross beams and rearwardly directed arms for mounting the frame for vertical movement on the forward end of the vehicle, a plurality of rake teeth and means for detachably supporting the teeth on the rake frame in transversely spaced upright position including apertured elements projecting rearwardly from the rake teeth intermediate the ends thereof, mating upwardly protruding apertured elements on the lower cross beam, retaining pins extending through said mating apertured elements, pairs of apertured elements protruding forwardly from the upper cross beam adapted to respectively receive the upper ends of the rake teeth and retaining pins extending through the apertures of said latter elements in front of the rake teeth.

2. In a pusher type rake attachment for vehicles, a rake frame adapted to be mounted on the front end of a vehicle and including vertically spaced upper and lower cross beams of rectangular cross section, longitudinally spaced pairs of apertured elements respectively protruding from the forward face of the upper cross beam and from the upper face of the lower cross beam, removable retaining pins extending through the apertures of said elements, a plurality of rake teeth each having an upper shank portion with the upper ends located between the apertured elements of the upper cross beam behind the pins, rearwardly directed apertured arms adjacent the lower ends of the shanks located between the elements of the lower cross beam with the apertures thereof aligned therewith and the pins extending therethrough and said teeth each having a foot portion depending from the shank portion and defining a rear shoulder underlying the lower cross beam.

3. In a pusher type rake attachment for vehicles, a rake frame adapted to be mounted on the front end of a vehicle and including vertically spaced upper and lower cross beams, longitudinally spaced pairs of apertured elements respectively protruding from the forward face of the upper cross beam and from the upper face of the lower cross beam, removable retaining pins extending through the apertures of said elements, a plurality of rake teeth each having a shank portion with the upper end thereof located between the apertured elements of the upper cross beam in rear of the pin, rearwardly directed apertured arms adjacent the lower ends of the shanks located between the elements of the lower cross beam with the apertures thereof aligned therewith and the pins extending therethrough to anchor the teeth to the rake frame, said teeth each having a foot portion depending from the shank portion and defining a shoulder at the rear of the tooth and underlying the lower cross beam, and pairs of spaced elements depending from the lower cross beam and engaging the opposite side faces of the foot portion of each rake tooth for bracing and reinforcing the same against lateral strains and stresses.

4. In a pusher type rake attachment for vehicles, a rake frame including a pair of vertically spaced horizontally disposed cross beams rigidly secured in superposed relation and having rearwardly directed arms for mounting the same on the front of the vehicle for vertical movement of said frame, a plurality of rake teeth each including a forwardly curved downwardly tapering foot portion and an upwardly directed shank portion having its forward edge flush with the foot portion and its rear edge offset forwardly from the rear edge of the foot portion to define a shoulder at the upper rear edge of the foot portion adapted to abut with the under side of the lower cross beam, elements secured to the shank portions of the teeth defining rearwardly directed arms spaced above and parallel to the shoulders so as to abut with the upper side of the lower cross beam, upstanding pairs of flanges on said lower cross beam between which said rearwardly directed arms are snugly engaged, said arms and said flanges having registering apertures, retaining pins adapted to extend through said apertures for anchoring the rake teeth to the lower cross beam of the rake frame, and means for receiving and holding the upper ends of the shank portions of the teeth in juxtaposition to the upper cross beam including spaced pairs of apertured elements protruding forwardly therefrom and retaining pins extending through said apertured elements in front of the shank portion located between said pairs of elements.

5. In a rake attachment for vehicles, a rake frame including a pair of parallel vertically spaced horizontally disposed cross beams, side plates rigidly connected to the opposite ends of the beams, rearwardly directed side arms rigidly secured at their forward ends to the opposite ends of the lower cross beam, inclined brace members secured at their lower rear ends to the side arms intermediate the ends thereof and secured at their upper forward ends to the opposite ends of the upper cross beam and diagonal struts connected at their rear lower ends to the side arms and at their forward upper ends to the upper cross beam adjacent the central portion thereof, a plurality of rake teeth and means for detachably supporting said rake teeth on the rake frame in transversely spaced upright position including apertured elements protruding rearwardly from the rake teeth intermediate the ends thereof, mating upwardly protruding apertured elements on the lower cross beam, retaining pins extending through said mating apertured elements for anchoring the rake teeth to the rake frame, pairs of apertured elements protruding forwardly from the upper cross beam adapted to respectively receive the upper ends of the rake teeth and retaining pins extending through the apertures of said latter elements in front of the rake teeth for confining the same between said pairs of elements.

EDWARD SEMBLER.
JOSEPH E. GERARD.